United States Patent [19]

Wharton

[11] Patent Number: 4,761,586

[45] Date of Patent: Aug. 2, 1988

[54] LINEARITY CORRECTION FOR MULTIPLE FREQUENCY VIDEO APPARATUS

[75] Inventor: James H. Wharton, Indianapolis, Ind.

[73] Assignee: RCA Licensing Corporation, Princeton, N.J.

[21] Appl. No.: 945,724

[22] Filed: Dec. 23, 1986

[51] Int. Cl.⁴ .................... H01J 29/70; H01J 29/76
[52] U.S. Cl. ................................. 315/408; 315/371
[58] Field of Search .............. 315/408, 371; 358/159

[56] References Cited

U.S. PATENT DOCUMENTS

| | | | |
|---|---|---|---|
| 4,234,824 | 11/1980 | Den Hollander | 315/371 |
| 4,501,995 | 2/1985 | Olmstead et al. | 315/371 |
| 4,695,774 | 9/1987 | Gent et al. | 315/408 |
| 4,705,993 | 11/1987 | Kashiwagi | 315/408 |

Primary Examiner—Theodore M. Blum
Attorney, Agent, or Firm—Eugene M. Whitacre; Joseph J. Laks; Sammy S. Henig

[57] ABSTRACT

A deflection circuit for a video apparatus that operates at multiple line rate deflection frequencies includes an S-shaping correction circuit that provides proper S-shaping of the line deflection current at any of the video apparatus line rate operating frequencies. A first S-shaping capacitor is in series with the deflection winding and also in series with a transformer primary winding. The transformer secondary winding is coupled to one or more capacitors. The secondary winding side capacitors are coupled to the secondary winding circuit in response to a line rate frequency indicative signal in order to form a series combination of the primary and secondary side capacitors. The effective capacitance of the secondary side capacitor is then equal to the actual capacitance value increased by a factor determined by the transformer secondary to primary winding turns ratio.

6 Claims, 1 Drawing Sheet

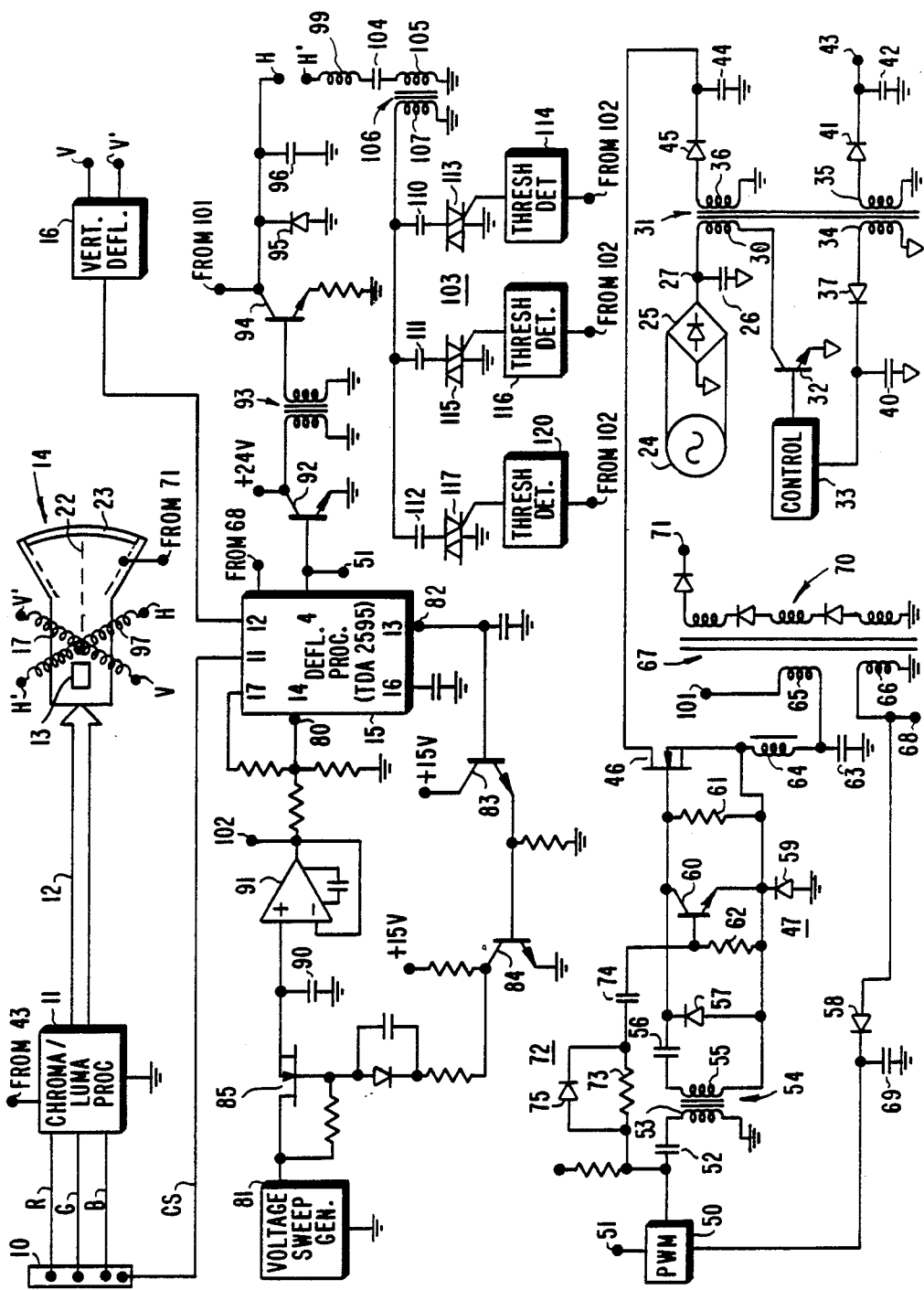

LINEARITY CORRECTION FOR MULTIPLE FREQUENCY VIDEO APPARATUS

This invention relates to video apparatus and, in particular, to S-correction circuitry for use with video apparatus operable at a number of different line rate frequencies.

A video apparatus, such as a television receiver or a computer monitor, for example, receives video information at a particular rate or frequency. The deflection or scanning circuits of the video apparatus are synchronized to the frequency of the video information in order to display the video information on a cathode ray tube. In the case of a conventional television receiver, the video information occurs at fixed, predetermined rates and methods of synchronization of the deflection systems are well known and relatively straightforward. A computer monitor, however, may be designed to be compatible with a variety of different computers of different manufacturers, which may produce video signals at different information rates. The range of possible operating frequencies may also be quite large, further complicating the deflection system design. It is possible to design a horizontal or line rate deflection oscillator that will become synchronized with incoming video information occurring at a finite number of known signal rates using frequency switching and automatic frequency control (AFC) circuitry. It is also desirable, in order to have expanded compatibility, to provide automatic synchronization of the deflection circuitry to any incoming video information frequency over a wide range of possible frequency values.

In video apparatus cathode ray tubes in which an electron beam is deflected by a magnetic field generated by the flow of the deflection current in a deflection winding, certain nonlinear distortions of the generated raster appear. One type of nonlinear distortion is attributable to the fact that the effective center of deflection of the electron beam is not coincident with the center of radius of curvature of the screen of the cathode ray tube (CRT). The distance from the center of deflection to the edges of the CRT screen is greater than the distance to the center of the CRT screen.

As a result of this source of nonlinearity, the deflection of the electron beam as a function of time, as seen on the raster displayed on the screen of the CRT, becomes progressively greater near the edges of the screen. Since the information to be displayed in a video system is encoded at a constant rate, the information as displayed on the screen will appear to become compressed in the center of the raster and stretched near the edges. In order to correct this nonlinearity, a capacitor is normally placed in series with the horizontal deflection windings. The capacitor charges during one portion of the horizontal scan interval and discharges during another portion, resulting in a so-called S-shaping modification of the horizontal scanning current that produces the appearance of a linear scan. The capacitance value of the S-shaping capacitor is carefully chosen and is dependent upon the inductance of the horizontal deflection winding and the line deflection or scan rate, in order to provide the optimum deflection current waveform for a particular cathode ray tube and deflection rate.

When the previously described deflection and S-shaping correction circuitry is used in video apparatus which has the capability of operating at more than one line rate frequency, the value of the S-shaping capacitor may be required to be changed as the deflection frequency is changed in order to achieve optimum S-shaping correction. As the line rate frequency is increased, the amount of capacitance needed to provide the desired amount of S-shaping decreases, since the S-shaping correcting waveform resonant frequency determined by the deflection winding inductance and the S-shaping capacitor also increases.

U.S. Pat. No. 4,588,929, issued May 13, 1986, in the names of Wedam et al., and entitled, "POWER SUPPLY AND DEFLECTION CIRCUIT PROVIDING MULTIPLE SCAN RATES" and U.S. patent application Ser. No. 868,631 filed May 30, 1986, in the name of W. F. Dietz, and entitled, "S-CAPACITANCE SWITCHING CIRCUIT FOR VIDEO DISPLAY" describe arrangements in which the amount of S-shaping capacitance is changed in response to changes in the deflection rate. As the number of possible deflection rate operating frequencies of the video apparatus increase, the complexity and cost of the circuitry needed to change the S-shaping capacitance greatly increases. The necessary size of the S-shaping capacitors themselves, which typically must conduct the deflection current, represents a significant cost as the number of operating frequencies increases. When the video apparatus is adapted to operate in response to the frequency of an incoming video signal, the S-shaping correction circuitry may become even more complex or costly, as changes in the S-shaping capacitance may be required for changes in the line deflection rate of the order of 5 kHz. It is therefore desirable to provide an effective S-shaping correction circuit that is easily and efficiently adaptable to multiple or continuous frequency video apparatus.

In accordance with an aspect of the present invention, a video apparatus having a cathode ray tube producing an electron beam incorporates a deflection circuit that is adapted for operating at a plurality of line rate frequencies. The deflection circuit comprises means for receiving a signal indicating a line rate frequency. A circuit responds to that signal and produces a deflection current for deflecting the electron beam. Circuitry modifies the deflection current to correct deflection distortions of the electron beam and includes a first capacitor, a transformer having a first winding coupled to the first capacitor, and a second capacitor. A circuit responds to the frequency indicating signal for coupling the second capacitor to a second winding of the transformer in order to combine the first and second capacitors.

In the accompanying drawing, the sole FIGURE is a block and schematic diagram of a portion of a video apparatus, including a deflection circuit in accordance with an aspect of the present invention.

Referring to the FIGURE, there is shown a portion of a video apparatus, illustrated as a color computer monitor, in which a video signal in the form of red, green and blue color video components are applied to the video display apparatus from an external source (not shown), such as a computer, via an input terminal strip 10. The color video components, designated R, G, and B are applied to chrominance and luminance processing circuitry 11 which generates red, green and blue color drive signals. The color drive signals are applied via a conductor 12 to the electron gun assembly 13 located within the neck of a cathode ray tube (CRT) 14.

Also applied to the video display apparatus via terminal strip 10 is a composite synchronizing (sync) signal, designated CS, that illustratively incorporates both line and field rate synchronizing information. The sync signal is applied to deflection processing circuitry 15, where it is separated into the respective line and field rate sync information components or pulses. Deflection processing circuitry 15 is illustratively shown as an integrated circuit designated TDA 2595, manufactured by Signetics Corporation. Device terminal numbers are also illustrated within the outline of deflection processing circuitry 15. The field rate, or vertical, sync pulses are applied via a conductor designated VS to vertical deflection circuitry 16 which produces vertical or field rate deflection current via terminal V and V' in vertical deflection winding 17, located on CRT 14. The deflection current flowing in deflection winding 17 creates an electromagnetic deflection field that provides vertical deflection of the electron beams 22 generated by electron gun assembly 13 in a predetermined pattern across phosphor display screen 23 located on the front panel of CRT 14.

It is desirable to configure the deflection circuitry of a video apparatus operating as a computer monitor to be able to operate at different deflection or scan frequencies, in order to be compatible with different computers having various operating frequencies, or with computers having two or more selectable frequencies that may be used to improve the resolution of the video display. Proper operation of the deflection circuits may require adjustment of the operating supply voltages at different deflection or operating frequencies. This is illustratively accomplished in the following manner.

A source of power, such as AC line supply 24, is connected to a rectifying circuit 25 and a filter capacitor 26 to provide a source of unregulated DC voltage at a terminal 27. The unregulated DC voltage is applied to one terminal of a winding 30 of a power transformer 31. The other terminal of winding 30 is connected to the collector of a switching transistor 32. Conduction of transistor 32, determined by control circuit 33, causes current to flow in winding 30 which, by transformer action, causes current to flow in windings 34, 35 and 36. The current in winding 34 is rectified by diode 37 and charges capacitor 40 to develop a feedback voltage that is applied to control circuit 33. In response to the feedback voltage, control circuit 33 controls the conduction interval of transistor 32 in order to maintain the voltage across capacitor 40 at a constant regulated level. Regulation of the voltage across capacitor 40 results in regulation of the load supplies derived from transformer windings 35 and 36. Transformer 31 also provides electrical isolation between the "hot" AC line and the "cold" load circuits and user interface connectors, such as input terminal strip 10. Winding 35 current, rectified by diode 41, charges capacitor 42 to provide a voltage at a terminal 43 that is used to power various circuits of the video display apparatus, such as chrominance and luminance processing circuit 11, for example. The voltage established across caacitor 44, derived from winding 36 via diode 45, is applied to the drain terminal of a field effect transistor (FET) 46, which forms part of a frequency dependent power supply circuit 47 that operates as follows.

Power supply circuit 47, operating as a DC to DC converter, incorporates pulse width modulating circuit 50, which receives an input signal at a terminal 51 from deflection processing circuitry 15. This input signal comprises pulses occurring at the horizontal deflection or line rate, invention in a manner that will be described later. Pulse width modulator circuit 50, illustratively comprises an integrated circuit designated NE5560, manufactured by Signetics Corporation. Pulse width modulator circuit 50 produces an output signal incorporating width-modulated pulses having a frequency determined in response to the input pulse frequency. The output signal of pulse width modulator circuit 50 is applied via coupling capacitor 52 to primary winding 53 of a transformer 54. Secondary winding 55 of transformer 54 has one terminal coupled via capacitor 56 to the cathode of a diode 57, the collector of a transistor 60, one terminal of a resistor 61 and the gate of FET 46. The other terminal of secondary winding 55 is coupled to the anode of diode 57, a transistor bias resistor 62, the emitter of transistor 60, the cathode of a flywheel diode 59, the other terminal of resistor 61 and the source terminal of FET 46. The source terminal of FET 46 is also coupled to a supply capacitor 63 via an inductor 64. Transformer 54 provides DC isolation that allows the secondary circuits to be referenced to the voltage across capacitor 63.

The deflection rate or frequency-representative pulses produced by pulse width modulator circuit 50 applied to primary winding 53 causes switching of FET 46 by transformer action. Conduction of FET 46 charges capacitor 63 via FET 46 and inductor 64 from the supply voltage developed across capacitor 44. Since the duty cycle of FET 46 is determined by the horizontal deflection frequency, the voltage developed across capacitor 63 will also be dependent upon the horizontal deflection rate or frequency and may therefore be utilized as a supply voltage for circuits that require different operating voltage levels in response to different deflection frequencies. The voltage across capacitor 63 is applied to a winding 65, which forms the primary winding of a conventional flyback-type high voltage transformer 67. The voltage developed across tertiary winding 70 forms a high voltage or ultor potential at a terminal 71 that is applied to CRT 14. The voltage developed across secondary winding 66 is applied to deflection processing circuitry 15 via a terminal 68. This voltage also develops a DC voltage level via diode 58 and a capacitor 69 that provides power to pulse width modulator circuit 50.

In order to avoid dissipating a significant amount of power in FET 46, and hence prevent its overheating, it is important that FET 46 be switched between its conduction states as quickly as possible. Pulses from pulse width modulator circuit 50 are coupled from the primary winding of transformer 54 to the base of transistor 60 via differentiating network 72 comprising resistor 73, capacitor 74, and diode 75. The leading edge of the turn-off pulse for FET 46 is differentiated by differentiating network 72 to form a positive going pulse signal which is applied to the base of transistor 60. The differentiated pulse from the trailing edge of the modulator 50 pulses is reduced in amplitude by diode 75. The differentiated positive-going pulses quickly turn on transistor 60 which in turn rapidly turn off FET 46.

As previously described, it is desirable that a video apparatus, particularly a video apparatus used as a computer monitor, be capable of operating at different video information rate frequencies in order to enhance the compatibility of the video apparatus when used with different computers. The video apparatus shown in the FIGURE will synchronize its operating frequency to that of any video information rate signal having a frequency occurring between predetermined upper and lower frequency limits, illustratively 15 kHz and 30 kHz, for example. Deflection processing circuitry 15 produces output signal pulses at terminal 51, for example, having a pulse frequency determined by the level of the voltage applied to a terminal 80. Synchronization of the frequency of the output pulse signal at terminal 51 with the frequency of the incoming video information as represented by the horizontal deflection or line rate synchronizing signal component on conductor CS is provided as follows. Voltage sweep generator 81, which may be of conventional design, produces a triangular output waveform that varies between a lower voltage level illustratively of the order of 1 volt and an upper voltage level illustratively of the order of 15 volts. The upper and lower voltage limits are selected so that the voltage levels that are applied to terminal 80 of deflection processing circuitry 15 result in a frequency range that encompasses the desired line rate or frequency operating range of the video apparatus.

As the output signal voltage of voltage sweep generator 81 is cyclically swept or varied through its voltage range, the horizontal or line rate oscillator of deflection processing circuitry 15 will in turn cyclically vary its operating frequency. During the time that the oscillator frequency does not correspond to the frequency of the incoming video information, as represented by the horizontal sync signal component appearing on conductor CS, the coincidence detector output of deflection processing circuitry 15 at terminal 82 will be a defined low level signal. This low level output, applied to the base of a transistor 83, will cause transistor 83 to be rendered nonconductive, which in turn maintains transistor 84 nonconductive. With transistor 84 nonconductive, the voltage at the collector of transistor 84 is high so that field effect transistor (FET) 85 is rendered conductive. Conduction of FET 85 allows the output voltage of voltage sweep generator 81 to charge capacitor 90, so that the voltage across capacitor 90 will follow the output voltage of voltage sweep generator 81. Amplifier 91, configured as a sample and hold circuit, acts to supply the voltage across capacitor 90 to input terminal 80 of deflection processing circuitry 15.

As the frequency of the oscillator of deflection processing circuitry 15 is varied in response to the varying output voltage of voltage sweep generator 81, the oscillator frequency will at some time correspond to that of the incoming horizontal rate sync signal. When this occurs, the coincidence detector output at terminal 82 will become a high level signal, thereby rendering transistor 83 conductive, which in turn causes transistor 84 to become conductive. The collector voltage of transistor 84 will fall to a level sufficient to render FET 85 nonconductive. The voltage across capacitor 90 will no longer follow the varying output voltage of voltage sweep generator 81, but will instead be maintained at the voltage level required to provide an oscillator frequency corresponding to the incoming video information rate frequency. This voltage is also applied to a terminal 102. The input impedance of amplifier 91 is very high so that the voltage level across capacitor 90 is maintained. Each time the incoming video information rate is changed, the oscillator of the deflection processing circuitry 15 is varied in a predetermined manner until coincidence with the incoming video information frequency is again established. The rate at which the output signal of voltage sweep generator 81 is varied between the frequency limits, illustratively of the order of 1 second, is selected to insure that any load circuit supply voltages that are required to be changed in response to the change in operating frequency have sufficient time to reach their desired voltage levels before the oscillator frequency is changed.

The output pulses of deflection processing circuitry 15, which appears at terminal 52, are also applied to the base of a line rate derived transistor 92 and cause transistor 92 to switch conductive states at the line rate frequency. These switching pulses are transmitted via a driver transformer 93 to the base of a horizontal output transistor 94, which forms part of a resonant retrace type of deflection output circuit. The output circuit illustratively includes a damper diode 95, a retrace capacitor 96, and a deflection winding 97, located on the neck of CRT 14 and connected via terminals H and H'. In series with deflection winding 97 is a magnetically biased saturable inductor 99 which provides raster linearity correction that compensates for energy losses during the latter part of each horizontal scan line.

In accordance with an aspect of the present invention, an S-shaping correction circuit 103, which corrects nonlinear distortion associated with CRT tube geometry, is coupled to deflection winding 97 via linearity inductor 99. Because the distance from the center of deflection of the electron beam to the CRT display screen does not coincide with the radius of curvature of the CRT faceplate, but is typically much less, the deflection of the electron beam as seen on the CRT display screen appears to become compressed in the center and stretched near the edges. S-shaping correction circuit 103 operates by modifying the rate of change of the deflection current through deflection winding 97 such that the change in deflection current is reduced near the edges of the display screen relative to the center. This results in a slight reduction in the rate of deflection or scanning of the electron beam near the edges of the scanned raster relative to the center, with an apparent reduction in the previously described nonlinear distortion. This S-shaping correction is achieved by charging a capacitor in series with the horizontal deflection winding during one half of the horizontal scanning interval and discharging the capacitor during the other half of the horizontal scanning or trace interval. Consequently, the voltage across the capacitor varies in a parabolic manner during the horizontal scanning interval such that in the center of the scanning interval the rate of change of the voltage across the capacitor is zero. The extent of change of the parabolic voltage across the capacitor from, illustratively, the beginning to the middle of the scanning interval, determines the extent of S-shaping correction provided by the capacitor. The capacitance of the S-shaping capacitor is carefully chosen, taking into account the inductance of the deflection winding and the horizontal or line deflection rate or frequency, in order to provide the desired deflection current waveform for a particular application.

As previously described, a change in the line rate frequency may require a change in the capacitance value of the S-shaping capacitor. In particular, the value of the S-shaping capacitance must decrease as the line rate frequency increases, since the S-shaping correcting waveform resonant frequency determined by the deflection winding inductance and the S-shaping capacitor must also correspondingly increase. In accordance with a novel aspect of the present invention, S-shaping correction circuit 103 provides proper S-shaping correction for a video apparatus operating at multiple line rate frequencies, or at any line rate frequency between two frequency limits in the following manner.

S-shaping correction circuit 103 incorporates a capacitor 104 coupled in series with deflection winding 97 via connection of one terminal of capacitor 104 to linearity correction inductor 99. The other terminal of capacitor 104 is connected to one terminal of a primary winding 105 of a transformer 106. The other terminal of primary winding 105 is illustratively shown as being coupled to ground but may also be coupled to side or E-W pincushion distortion correction circuitry, such as conventional diode modulator circuitry, for example. Transformer 106 also comprises a secondary winding 107, which is magnetically tightly coupled to primary winding 105. Capacitors 110, 111, and 112 are connected to secondary winding 107, and are illustratively shown as being connected in parallel with one terminal of each of capacitors 110, 111, and 112 connected to secondary winding 107. The other terminal of capacitor 110 is coupled to a switch, illustratively shown as triac 113. The gate of triac 113 is coupled to threshold detecting circuitry 114, which in turn receives an input signal via terminal 102. In a similar manner, capacitor 111 is connected to triac 115, having its gate connected to threshold detecting circuitry 116, and capacitor 112 is connected to triac 117, with its gate terminal connected to threshold detecting circuitry 120. Threshold detecting circuits 116 and 120 also receive an input signal via terminal 102.

Transformer 106 acts to transfer the impedance associated with the secondary winding-connected circuitry to the primary winding side of the transformer. The secondary winding side impedance as seen by the primary winding side of transformer 106 is defined by the relationship $Z_{PRI} = Z_{SEC} n^2$ where $Z_{PRI}$ is the apparent secondary side impedance transferred to the primary winding side, $Z_{SEC}$ is the actual secondary winding side impedance, and n is the winding turns ratio of the transformer. For a transformer having a large winding turns ratio, therefore, a relatively small secondary impedance will be reflected as a relatively large impedance as seen by the primary winding side.

In the S-shaping correction circuit 103, conduction of any of triacs 113, 115, or 117 effectively couples the associated capacitor to secondary winding 107 which act to place the associated capacitor 110, 111, or 112 in series with capacitor 104 via transformer 106, forming a combined capacitor. The combined capacitor has a capacitance value determined by the series combination of capacitor 104 and the transferred impedance of the secondary capacitor. Transformer 106 is made to have a large secondary to primary winding turns ratio, so that a large effective capacitance may be placed in series with capacitor 104 using relatively small capacitance values for capacitors 110, 111 and 112. This greatly reduces the cost of the capacitors. Since horizontal or line deflection current does not flow in capacitors 110, 111 and 112 due to the presence of transformer 106, the current rating of those capacitors is less than if capacitors 110, 111 and 112 were to be directly connected in series with capacitor 104, further reducing the cost of capacitors 110, 111, and 112.

The capacitance values of capacitors 110, 111, and 112, and the secondary to primary winding turns ratio of transformer 116 is selected such that the series combination of capacitor 104 and the effective impedance of capacitors 110, 111, and 112 forms the necessary S-shaping capacitance required to correct the nonlinear distortion occurring at all the frequencies at which the video apparatus may operate. As the required capacitance value decreases as line rate frequency increases, the video apparatus may be configured such that at the lowest desired line rate frequency only capacitor 104 is required to provide the necessary S-shaping correction. As the line rate frequency increases, the amount of capacitance added in series with capacitor 104 will increase. One or more of triacs 113, 115, and 117 may be gated into conduction in response to the desired line rate frequency in order to form the necessary capacitance value for effective S-shaping correction.

In the FIGURE, each of threshold detectors 114, 116, and 120 receive a line rate frequency indicative signal, illustratively represented by the voltage output of amplifier 91. The threshold level of each of threshold detectors 114, 116, and 120 may be set to cause the respective threshold detectors to produce an output signal, thereby gating their associated triac into conduction, at a voltage level representative of a line rate frequency requiring a particular amount of S-shaping capacitance. That required amount of capacitance is thereby provided by the combination of capacitor 104 and the capacitor associated with the triacs that are conductive. Threshold detection 114, 116 and 120 may be configured to produce an output signal for any input voltage above the threshold level, or only within a range of input voltages, as in the form of a window detector. The configuration of the threshold detectors, which is of course a choice of design, will then determine whether only one of capacitors 110, 111, and 112 is made part of the S-shaping correction circuit at any given time, or whether the S-shaping capacitance may be formed by capacitor 104 and one or more of capacitors 110, 111, and 112. The number of secondary winding side capacitors is shown as three for illustrative purposes only. The actual number of capacitors needed will depend upon the number of possible line rate frequencies at which the video apparatus may operate, or the degree of precision of S-shaping correction that is desired. As an illustrative example, it was found that for a video apparatus having a capacitance value for capacitor 104 of 3uF and a transformer turns ratio of approximately 73, the capacitance value of capacitor 110, for operation at 21.9 kHz was determined to be 0.1uF, which translates to a capacitance of 0.54F in series with capacitor 104. For operation at 25 kHz line rate frequency, capacitor 111 was determined to be 0.0023uF. For operation at a line rate frequency of 30 kHz, the capacitance of capacitor 112 is required to be 651pF. In a similar manner, S-shaping correction at other line rate frequencies or within other frequency ranges, could be provided. The resonant frequency formed by the combination of the secondary winding capacitor and the secondary winding inductance is chosen to be less that the associated operating line rate frequency to insure that the impedance transferred to the primary winding side of transformer 106 is capacitive in nature.

What is claimed is:

1. In a video apparatus having a cathode ray tube producing an electron beam, a deflection circuit adapted for operating at a plurality of line rate frequencies comprising:

means for receiving a signal indicative of a line rate frequency;

means responsive to said line rate frequency indicative signal for producing deflection current for deflecting said electron beam; and means, coupled to said deflection current producing means for modifying said deflection current to correct distortion in the deflection of said electron beam, comprising:

a first capacitor;

a transformer having a first winding coupled to said first capacitor and having a second winding magnetically coupled to said first winding;

a second capacitor; and means responsive to said line rate frequency indicative signal for coupling said second capacitor to said second winding for combining said first and second capacitors.

2. The arrangement defined in claim 1, wherein said means for modifying said deflection current comprises means for providing S-shaping correction.

3. The arrangement defined in claim 1, wherein the effective capacitance of said second capacitor in combination with said first capacitor is the capacitance of said second capacitor increased by a factor equal to the square of the ratio determined by the number of winding turns of said second winding divided by the number of turns of said first winding.

4. The arrangement defined in claim 1, wherein said first and second capacitors are combined in series.

5. The arrangement defined in claim 1, wherein said means for coupling said first and second capacitors comprises a threshold detector responsive to said line rate frequency indicative signal.

6. In a video apparatus adapted to operate at a plurality of line rate frequencies and including a cathode ray tube producing an electron beam that impinges upon a display screen, an electron beam deflection circuit comprising:

means for receiving a signal indicative of a desired line rate frequency;

oscillator means responsive to said line rate frequency indicative signal for producing an output signal having said desired line rate frequency;

means, including a deflection winding, responsive to said oscillator output signal for producing a current in said deflection winding for deflecting said electron beam across said display screen; and S-shaping correction means for modifying said current comprising:

a first capacitor coupled in series with said deflection winding;

a transformer having a primary winding coupled to said first capacitor and having a second winding;

a second capacitor; and means for coupling said second capacitor to said second winding in response to said line rate indicative signal in order to form a resultant capacitor comprising the combination of said first capacitor and said second capacitor.

* * * * *